United States Patent
Steigleder

(10) Patent No.: US 9,766,873 B2
(45) Date of Patent: Sep. 19, 2017

(54) OPERATING SYSTEM PATCHING AND SOFTWARE UPDATE RECONCILIATION

(71) Applicant: Tripwire, Inc., Portland, OR (US)

(72) Inventor: Andrew C. Steigleder, Camas, WA (US)

(73) Assignee: Tripwire, Inc., Portland, OR (US)

( * ) Notice: Subject to any disclaimer, the term of this patent is extended or adjusted under 35 U.S.C. 154(b) by 176 days.

(21) Appl. No.: 13/631,517

(22) Filed: Sep. 28, 2012

(65) Prior Publication Data

US 2014/0053145 A1     Feb. 20, 2014

Related U.S. Application Data

(60) Provisional application No. 61/684,664, filed on Aug. 17, 2012.

(51) Int. Cl.
    *G06F 9/445*       (2006.01)
    *G06F 17/30*      (2006.01)
    *G06F 9/44*        (2006.01)

(52) U.S. Cl.
    CPC ............... *G06F 8/65* (2013.01); *G06F 17/30* (2013.01); *G06F 8/61* (2013.01); *G06F 8/68* (2013.01)

(58) Field of Classification Search
    CPC ..... G06F 8/61; G06F 8/65; G06F 8/68; G06F 17/30
    See application file for complete search history.

(56) References Cited

U.S. PATENT DOCUMENTS

| | | | |
|---|---|---|---|
| 5,361,360 A | 11/1994 | Ishigami et al. | |
| 6,041,347 A | 3/2000 | Harsham | |
| 6,122,664 A | 9/2000 | Boukobza | |
| 6,282,709 B1 | 8/2001 | Reha et al. | |
| 6,353,926 B1 | 3/2002 | Parthesarathy et al. | |
| 6,405,309 B1 | 6/2002 | Cheng et al. | |
| 6,789,255 B1 | 9/2004 | Pedrizetti et al. | |
| 6,814,510 B1 | 11/2004 | Sabbagh et al. | |

(Continued)

FOREIGN PATENT DOCUMENTS

| | | |
|---|---|---|
| EP | 0999496 | 5/2000 |
| WO | WO 9425924 | 11/1994 |

OTHER PUBLICATIONS

DiFalco et al., U.S. Appl. No. 60/706,938, filed Aug. 9, 2005, Specifiction 26 pages.*

(Continued)

*Primary Examiner* — Ziaul A Chowdhury
(74) *Attorney, Agent, or Firm* — Klarquist Sparkman, LLP

(57) ABSTRACT

Apparatus and methods are disclosed for implementing software reconciliation frameworks to process changes detected to software installed on computer hosts. According to one embodiment, a method includes receiving change data describing changes to one or more software components stored on a computer-readable storage device, determining installed software on a computer associated with the computer-readable storage device, receiving a manifest comprising a description of file changes associated with a software patch or update for the installed software, and comparing the change data to the manifest. Based on the comparing, if the change data matches the manifest, the changes are promoted, and if the change data does not match the manifest, the changes are marked for further analysis.

17 Claims, 11 Drawing Sheets

(56) References Cited

U.S. PATENT DOCUMENTS

| | | | | |
|---|---|---|---|---|
| 6,976,133 | B1* | 12/2005 | Wynn | G06F 8/65 709/215 |
| 7,243,348 | B2 | 7/2007 | Good et al. | |
| 7,316,016 | B2 | 1/2008 | DiFalco | |
| 7,360,099 | B2 | 4/2008 | DiFalco et al. | |
| 7,490,322 | B2 | 2/2009 | Pichetti et al. | |
| 7,587,754 | B2 | 9/2009 | DiFalco et al. | |
| 7,620,715 | B2 | 11/2009 | DiFalco et al. | |
| 7,765,460 | B2 | 7/2010 | DiFalco et al. | |
| 7,822,724 | B2 | 10/2010 | DiFalco et al. | |
| 7,890,469 | B1* | 2/2011 | Maionchi | G06F 17/30067 707/654 |
| 7,934,210 | B1* | 4/2011 | Stampfli | G06F 8/61 709/220 |
| 8,140,635 | B2 | 3/2012 | DiFalco | |
| 8,176,158 | B2* | 5/2012 | DiFalco et al. | 709/223 |
| 8,316,224 | B2* | 11/2012 | Vidal et al. | 713/100 |
| 8,332,497 | B1* | 12/2012 | Gladish | G06F 17/30197 707/610 |
| 8,615,752 | B2* | 12/2013 | Izard et al. | 717/169 |
| 2001/0044840 | A1 | 11/2001 | Carleton | |
| 2002/0010910 | A1 | 1/2002 | Crudele et al. | |
| 2003/0217134 | A1 | 11/2003 | Fontoura et al. | |
| 2004/0093592 | A1* | 5/2004 | Rao | G06F 8/65 717/168 |
| 2004/0224674 | A1* | 11/2004 | O'Farrell | G06F 17/30575 455/418 |
| 2005/0155031 | A1* | 7/2005 | Wang et al. | 717/170 |
| 2006/0242277 | A1 | 10/2006 | Torrence et al. | |
| 2007/0043674 | A1* | 2/2007 | DiFalco et al. | 705/51 |
| 2007/0043786 | A1 | 2/2007 | DiFalco et al. | |
| 2007/0124255 | A1 | 5/2007 | DiFalco et al. | |
| 2009/0222462 | A1* | 9/2009 | Alpern | G06F 17/30 |
| 2009/0222468 | A1* | 9/2009 | Alpern | G06F 17/30 |
| 2010/0005107 | A1 | 1/2010 | DiFalco | |
| 2010/0138625 | A1* | 6/2010 | Noguchi | G06F 8/65 711/167 |
| 2011/0055544 | A1* | 3/2011 | Vidal et al. | 713/100 |
| 2011/0113424 | A1* | 5/2011 | Ewington | G06F 8/68 717/178 |
| 2011/0137905 | A1 | 6/2011 | Good et al. | |
| 2011/0138038 | A1 | 6/2011 | Good et al. | |
| 2011/0138039 | A1 | 6/2011 | Good et al. | |
| 2011/0197094 | A1 | 8/2011 | Wagner | |
| 2011/0197189 | A1 | 8/2011 | Wagner et al. | |
| 2011/0197205 | A1 | 8/2011 | Wagner et al. | |
| 2012/0011507 | A1* | 1/2012 | Sasaki | G06F 8/65 718/1 |
| 2012/0079471 | A1 | 3/2012 | Vidal et al. | |
| 2013/0332900 | A1* | 12/2013 | Berg | G06F 8/71 717/121 |
| 2013/0332916 | A1* | 12/2013 | Chinn | G06F 8/65 717/169 |
| 2013/0339941 | A1* | 12/2013 | Shelton | G06F 8/68 717/172 |

OTHER PUBLICATIONS

Wikipedia entry for Regular Expression, [Retrieved from the Internet on Mar. 31, 2015] <http://en.wikipedia.org/wiki/Regular_expression> 24 pages total.*

Michael Jang, Linux Patch Management: Keeping Linux Systems Up to Date, [Online] 2006, Pearson Education, Inc., pp. 8 and 28-29.*

Maha Shaikh et al. "Version Control Software for Knowledge Sharing, Innovation and Learning in OS", [Online], 2003, pp. 1-9, [Retrieved from Internet on Apr. 29, 2017], <http://s3.amazonaws.com/academia.edu.documents/35817423/OpenSourceC_T.pdf>.*

Hardi Hungar et al. "Opening up the Verification and Validation of Safety-Critical Software", [Online], 2013, pp. 483-491, [Retrieved from Internet on Apr. 29, 2017], <https://pdfs.semanticscholar.org/f5ad/3c0fc96aec275030510402f620f434bddf96.pdf>.*

Peter J. Denning et al., "A Discipline of Software Architecture", [Online], 1994, pp. 55-65, [Retrieved from Interent on Apr. 29, 2017], <http://delivery.acm.org/10.1145/180000/174807/p55-denning.pdf>.*

WH Morkel Theunissen et al., "Open Source and Agile Software Development in Corporates: A Contradiction or an Opportunity?", [Online], 2005, pp. 1-11, [Retrieved from Interent on Apr. 29, 2017], <http://espresso.cs.up.ac.za/publications/mtheunissen_etal_jacquard2005_paper.pdf>.*

Childs et al., "Devolved Management of Distributed Infrastructures With Quattor," *22nd Large Installation System Administration Conference*, pp. 175-189 (2008).

Dunagan et al., "Towards a Self-Managing Software Patching Process Using Black-Box Persistent-State Manifests," *IEEE International Conference on Autonomic Computing (ICAC)*, 9 pp. (May 2004).

Niedzielski, "Exploring the yum package manager DELICIOUS," *A Taste of Yum*, vol. 103, pp. 78-81 (Jun. 2009).

Tucker, "OPIUM: Optimal Package Install/Uninstall Manager," Thesis, University of California, San Diego, 42 pp. (2008).

* cited by examiner

```
asteigle@denethor:~
[asteigle@denethor ~]$ sudo yum check-update
Loaded plugins: fastestmirror, refresh-packagekit
base                                                  | 1.3 kB      00:00
base/primary                                          | 1.9 MB      00:00
base                                                               4558/4558
update                                                | 3.5 kB      00:00 bind-libs.i686           32:9.7.3-8.P3.el6_2.1                      update
bind-utils.i686          32:9.7.3-8.P3.el6_2.1                      update
dhclient.i686            12:4.1.1-25.P1.el6_2.1                     update
jasper.i686              1.900.1-15.el6_1.1                         update
jasper-libs.i686         1.900.1-15.el6_1.1                         update
java-1.6.0-openjdk.i686  1:1.6.0.0-1.42.1.10.4.el6_2                update
kernel.i686              2.6.32-220.2.1.el6                         update
kernel-devel.i686        2.6.32-220.2.1.el6                         update
kernel-firmware.noarch   2.6.32-220.2.1.el6                         update
kernel-headers.i686      2.6.32-220.2.1.el6                         update
libarchive.i686          2.8.3-3.el6_1                              update
libicu.i686              4.2.1-9.1.el6_2                            update
nss.i686                 3.12.10-17.el6_2                           update
nss-sysinit.i686         3.12.10-17.el6_2                           update
pango.i686               1.28.1-3.el6_0.5.1.centos                  update
perf.i686                2.6.32-220.2.1.el6                         update
```
410

⇩

Report Viewer - Mozilla Firefox portgnome.com | https://tripwire.portnome.com/console/app.showEditor.cmd?editorName=reportManager.editor.reportViewerDialog&wndNam Report Viewer                                                                              ↔Refresh ⌐Help

[Archive Report] [PDF Export] [XML Export] [CSV Export] [Email] [Elements View] [Versions View] [Print]

Recent System Update Change(s)

Node: colossus (Linux Server)

| Date | Element | Change Type | Attributes | Users | Promotion Approval ID | |
|---|---|---|---|---|---|---|
| 12/31/11 5:35 PM | /usr/sbin/dhcpd | Removed | | root | RPM UPDATE | dhcp-3.0.5-29.el5 ... |
| 12/31/11 5:35 PM | /usr/sbin/dhcrelay | Removed | | root | RPM UPDATE | dhcp-3.0.5-29.el5 ... |
| 12/31/11 5:35 PM | /etc/dhcpd.conf | Removed | | root | RPM UPDATE | dhcp-3.0.5-29.el5 ... |
| 12/31/11 5:35 PM | /etc/rc.d/init.d/dhcpd | Removed | | root | RPM UPDATE | dhcp-3.0.5-29.el5 ... |
| 12/31/11 5:35 PM | /etc/rc.d/init.d/dhcrelay | Removed | | root | RPM UPDATE | dhcp-3.0.5-29.el5 ... |
| 12/31/11 5:35 PM | /etc/sysconfig/dhcpd | Removed | | root | RPM UPDATE | dhcp-3.0.5-29.el5 ... |
| 12/31/11 5:35 PM | /etc/dhcpd.conf | Removed | | root | RPM UPDATE | dhcp-3.0.5-29.el5 ... |
| 12/31/11 5:35 PM | /etc/sysconfig/dhcrelay | Removed | | root | RPM UPDATE | dhcp-3.0.5-29.el5 ... |
| 12/31/11 5:35 PM | /etc/sysconfig/dhcpd | Removed | | root | RPM UPDATE | dhcp-3.0.5-29.el5 ... |

[Close]

X Standard | off | IP : 50.53.171.100

```
asteigle@tripwire:/opt/tripwire/gnosis/bin                              _ □ ✕
to criminal prosecution. Evidence of unauthorized use collected during
monitoring may be used for administrative, criminal, or other adverse
action. Use of this system constitutes consent to monitoring for these
purposes.
Using keyboard-interactive authentication.
Password:
Last login: Thu Jan 5 09:39:14 2012 from mithril.portgnome.com
[asteigle@tripwire ~] $ cd / opt/tripwire/gnosis//bin
[asteigle@tripwire bin] $ sudo / opt/tripwire/gnosis/bin/twgnosis.linux32.bin -1 /
opt/tripwire/gnosis/log  -d  -c /opt/tripwire/gnosis/bin/twpatchintegration-home.x
ml
[sudo] password for asteigle:

Tripwire Gnosis v0.5.0
Tripwire Customer Services, Copyright 2011 Tripwire Inc.

Running Windows Update Integration...
No update change (s) at this time

Running Software Update Integration...
No update change (s) at this time.

Running RPM Integration...
  Promoting change(s) for RPM 'dhcp-3.0.5-29.cl5_7.1.x86_64.rpm"...
    Promoting node 'colossus'...done.
[asteigle@tripwire bin] $ ▮
```

Report Viewer - Mozilla Firefox portgnome.com | https://tripwire.portnome.com/console/app.showEditor.cmd?editorName=reportManager.editor.reportViewerDialog&wndNam Report Viewer — Refresh  Help

[Archive Report] [PDF Export] [XML Export] [CSV Export] [Email] [Elements View] [Versions View] [Print]

Recent System Update Change(s)

Node: colossus (Linux Server)

| Date | Element | Change Type | Attributes | Users | Promotion Approval ID |
|---|---|---|---|---|---|
| 12/31/11 5:35 PM | /usr/sbin/dhcpd | Removed | | root | RPM UPDATE  dhcp-3.0.5-29.el5 ... |
| 12/31/11 5:35 PM | /usr/sbin/dhcrelay | Removed | | root | RPM UPDATE  dhcp-3.0.5-29.el5 ... |
| 12/31/11 5:35 PM | /etc/dhcpd.conf | Removed | | root | RPM UPDATE  dhcp-3.0.5-29.el5 ... |
| 12/31/11 5:35 PM | /etc/rc.d/init.d/dhcpd | Removed | | root | RPM UPDATE  dhcp-3.0.5-29.el5 ... |
| 12/31/11 5:35 PM | /etc/rc.d/init.d/dhcrelay | Removed | | root | RPM UPDATE  dhcp-3.0.5-29.el5 ... |
| 12/31/11 5:35 PM | /etc/sysconfig/dhcpd | Removed | | root | RPM UPDATE  dhcp-3.0.5-29.el5 ... |
| 12/31/11 5:35 PM | /etc/dhcpd.conf | Removed | | root | RPM UPDATE  dhcp-3.0.5-29.el5 ... |
| 12/31/11 5:35 PM | /etc/sysconfig/dhcrelay | Removed | | root | RPM UPDATE  dhcp-3.0.5-29.el5 ... |
| 12/31/11 5:35 PM | /etc/sysconfig/dhcpd | Removed | | root | RPM UPDATE  dhcp-3.0.5-29.el5 ... |

[Close]

X Standard | off | IP : 50.53.171.100

Fig. 11

OPERATING SYSTEM PATCHING AND SOFTWARE UPDATE RECONCILIATION

CROSS-REFERENCE TO RELATED APPLICATIONS

This application claims the benefit of U.S. Provisional Application No. 61/684,664, titled "OPERATING SYSTEM PATCHING AND SOFTWARE UPDATE RECONCILIATION," filed Aug. 17, 2012, which application is hereby incorporated herein by reference in its entirety for all purposes.

FIELD

This application relates generally to the field of information technology ("IT") compliance and configuration control, including control and reconciliation of operating system patching and software updates.

SUMMARY

Apparatus, computer-readable storage media, and methods are disclosed below for comparing changes detected on a computer with a manifest associated with a software update. In one example, a method of using a Software Reconciliation Framework (SRF) tool comprises receiving data describing a number of changes to files on a computer-readable storage device, determining software that has been installed on a computer comprising the computer-readable storage device, requesting a description of files associated with a software patch or update, receiving a manifest describing the files, comparing the manifest to the changed file(s) on the computer, and if the changed file(s) matches the manifest, approving the changed file(s), but if the changed file(s) do not match the manifest, marking or flagging the changed file(s) for further analysis.

In some examples of the disclosed technology, a computer-implemented method of using a Software Reconciliation Framework (SRF) tool includes receiving change data describing changes to one or more files stored on a computer-readable storage device, determining installed software on a computer associated with the computer-readable storage device, receiving a manifest comprising a description of file changes associated with a software patch or update for the installed software, and comparing the change data to the manifest. If the change data matches the manifest, the changes are promoted, and if the change data does not match the manifest, the changes are marked for further analysis. In some examples, the manifest can be received after transmitting a request to a remote server by determining a network address associated with a software repository for the installed software.

In some examples of the disclosed technology, a method of reconciling software changes on a host computer includes receiving one more changes to one or more software components detected by an agent or a compliance and configuration tool executing on the host computer, generating a description of expected changes for one or more software components installed on the host computer, comparing the description to the received changes. Based on the comparing, at least one of the received changes is promoted to be indicated as an approved change in a promotion database.

In some examples, the changes are received in response to a change trigger, such as a software change trigger or an authorized change trigger. In some examples, the changes are detected by applying a command output capture rule (COCR) including a regular expression to at least one of the software components. In some examples, a method of reconciling software changes further includes marking at least one of the received changes for further analysis based on the at least one change not being promoted based on the manifest comparison.

In some examples, a method of reconciling software changes further includes receiving a second set of one or more changes, the second set of changes including at least one change in the first set of changes, comparing a description of the expected changes the second set of one or more changes, and not reporting at least one of the second set of changes, based on at least one or more of the second set of changes matching an approved change in a promotion database.

In some examples of the disclosed technology, a system includes one or more processors, memory coupled to the processors, at least one network interface, and one or more non-transitory computer-readable storage media coupled to the processors, the computer-readable storage media storing modules comprising computer-executable instructions executable by the processors. In some examples of the disclosed technology, the modules include a manifest acquisition module configured to receive one or more software manifests using the network interface, the manifests comprising data describing one or more software modules stored on the computer-readable storage media, a user-configurable reconciliation module configured to reconcile changes detected in the system based on approved changes in the software manifest, a configuration module configured to provide access to system credentials and network addresses that can be accessed by the manifest acquisition module to request the software manifests using an application layer of the network interface, and a rule configuration module configured to manage rules defining changes to software modules that have been defined as approved.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

The foregoing and other objects, features, and advantages of the invention will become more apparent from the following detailed description, which proceeds with reference to the accompanying figures.

BRIEF DESCRIPTION OF THE DRAWINGS

FIG. 4 illustrates an aspect of a package manager as can be used in certain embodiments of the disclosed technology.

FIGS. 6A-6E illustrate interface aspects of certain embodiments of the disclosed technology.

FIGS. 8-11 illustrate aspects of certain embodiments of the disclosed technology.

DETAILED DESCRIPTION

I. General Considerations

Figure 1:
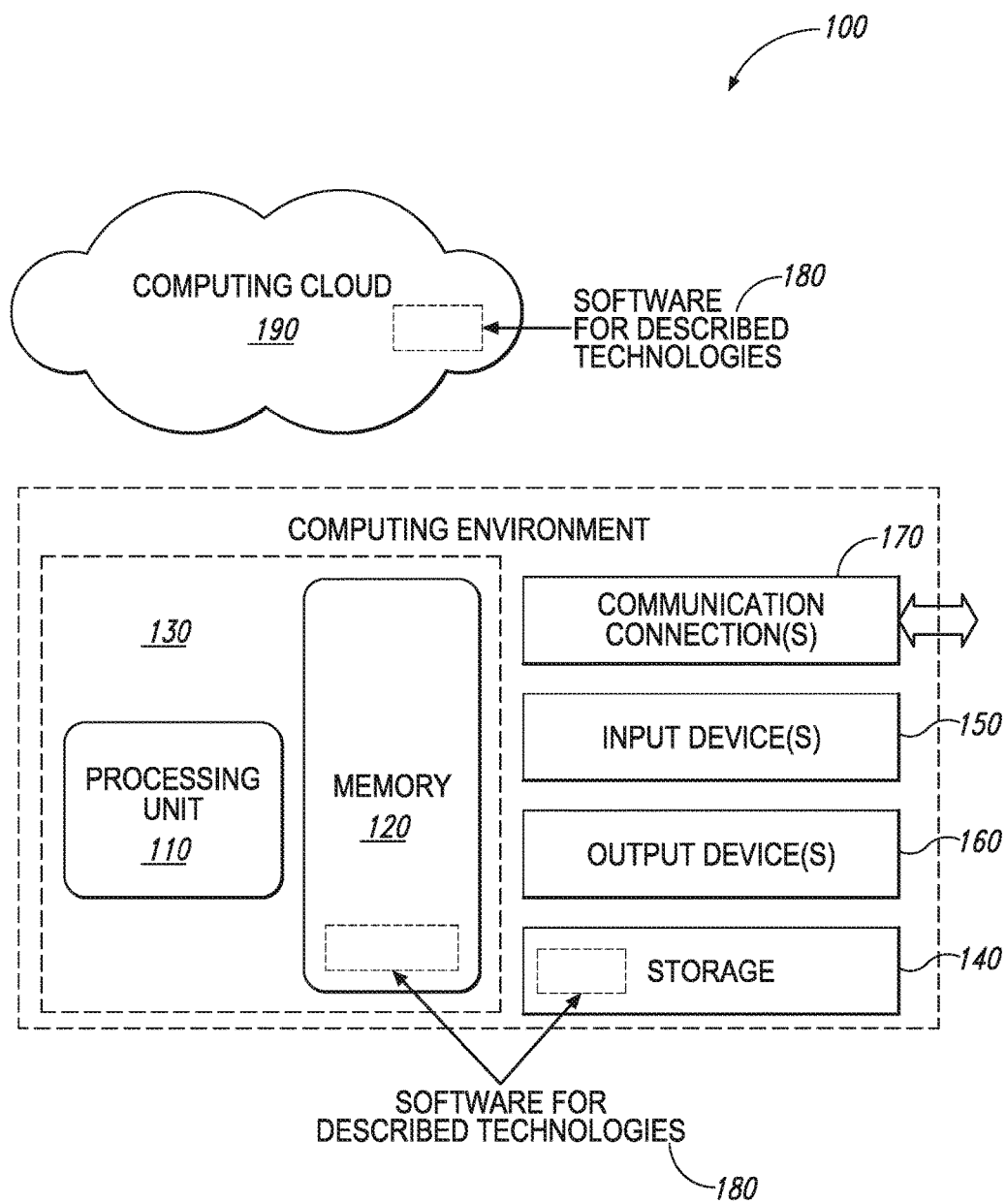
FIG. 1 illustrates a generalized example of a suitable computing environment in which described embodiments, techniques, and technologies can be implemented.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "promote," "compare," "match," and "mark" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Example Computing Environments for Implementing Embodiments of the Disclosed Technology FIG. 1 illustrates a generalized example of a suitable computing environment 100 in which described embodiments, techniques, and technologies, including an SRF tool, can be implemented. For example, the computing environment 100 can implement comparing a manifest to changed files on a target host, as described herein.

The computing environment 100 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 1, the computing environment 100 includes at least one central processing unit 110 and memory 120. In FIG. 1, this most basic configuration 130 is included within a dashed line. The central processing unit 110 executes computer-executable instructions and may be a real or a virtual processor. In a multi-processing system, multiple processing units execute computer-executable instructions to increase processing power and as such, multiple processors can be running simultaneously. The memory 120 may be volatile memory (e.g., registers, cache, RAM), non-volatile memory (e.g., ROM, EEPROM, flash memory, etc.), or some combination of the two. The memory 120 stores software 180, images, and video that can, for example, implement the technologies described herein. A computing environment may have additional features. For example, the computing environment 100 includes storage 140, one or more input devices 150, one or more output devices 160, and one or more communication connections 170. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, CD-RWs, DVDs, or any other medium which can be used to store information and that can be accessed within the computing environment 100. The storage 140 stores instructions for the software 180 and image data, which can implement technologies described herein.

The input device(s) 150 may be a touch input device, such as a keyboard, keypad, mouse, touch screen display, pen, or trackball, a voice input device, a scanning device, or another device, that provides input to the computing environment 100. For audio, the input device(s) 150 may be a sound card or similar device that accepts audio input in analog or digital form, or a CD-ROM reader that provides audio samples to the computing environment 100. The output device(s) 160 may be a display, printer, speaker, CD-writer, or another device that provides output from the computing environment 100.

The communication connection(s) 170 enable communication over a communication medium (e.g., a connecting network) to another computing entity. The communication medium conveys information such as computer-executable instructions, compressed graphics information, video, or other data in a modulated data signal.

Some embodiments of the disclosed methods can be performed using computer-executable instructions implementing all or a portion of the disclosed technology in a computing cloud 190. For example, user input can be received in the computing environment 130 while producing modified video can be performed on servers located in the computing cloud 190.

Computer-readable media are any available media that can be accessed within a computing environment 100. By way of example, and not limitation, with the computing environment 100, computer-readable media include memory 120 and/or storage 140. As should be readily understood, the term computer-readable storage media includes the media for data storage such as memory 120 and storage 140, and not transmission media such as modulated data signals.

Figure 2:
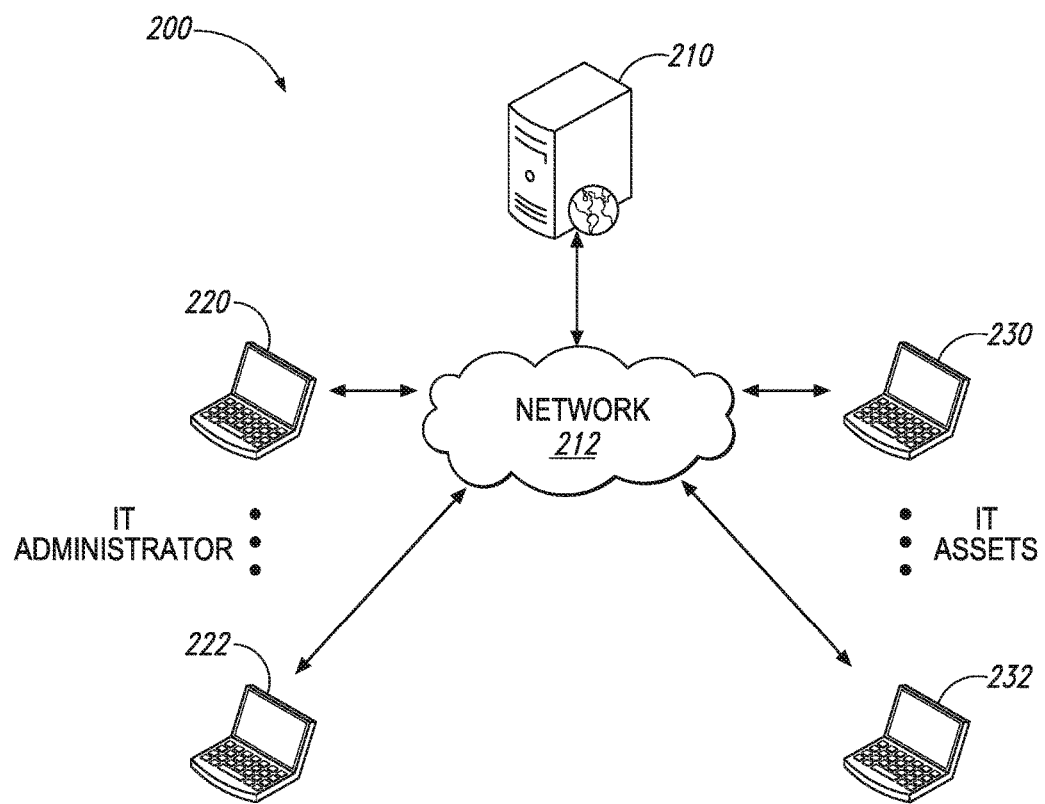
FIG. 2 illustrates a generalized example of a network topology in which described embodiments, techniques, and technologies can be implemented.

III. Example Networking Environments for Implementing Embodiments of the Disclosed Technology An example of a possible network topology (e.g., a client-server network) for implementing an SRF system according to the disclosed technology is depicted in FIG. 2. Networked computing devices 220, 222, 230, 232 can be, for example, computers running a browser, plug-in, or other software that communicates with one or more central computers 210 via network 212. The computing devices 220, 222, 230, 232 and the central computer 210 can have computer architectures as shown in FIG. 1 and discussed above. The computing devices 220, 222, 230, 232 are not limited to traditional personal computers but can comprise other computing hardware configured to connect to and communicate with a network 212 (e.g., smart phones or other mobile computing devices, servers, network devices, dedicated devices, and the like).

In the illustrated embodiment, the computing devices 220, 222, 230, 232 are configured to communicate with one or more central computers 210 (e.g., using a cloud network or other client-server network). In certain implementations, the central computers 210 executes software for performing any of the disclosed compliance and configuration control functionalities, for implementing any of the disclosed graphical user interfaces, and/or for computing any one or more of the intermediate or final values associated with the disclosed embodiments. The central computers 210 can transmit data to any of the computing devices 220, 222 (e.g., data to be displayed on a graphical user interface or web page at the computing devices 220, 222). For example, the computing devices 220, 222 (e.g., computing devices associated with an IT administer) can transmit a request for data to the central computer 210 over the network 212. In order to provide the data, the one or more central computers 210 can access data from the computing devices 230, 232 (e.g., computing devices or other devices associated with assets in the IT infrastructure administered by the IT administrator), which can store various types of data used by the IT administrator. For example, the computing devices 230, 232 may store device configuration data, compliance policy data, and/or other such data used by an IT compliance and configuration control tool. Alternatively, the one or more central computers 210 may themselves store the device configuration data, compliance policy, and other such IT data.

Figure 3:
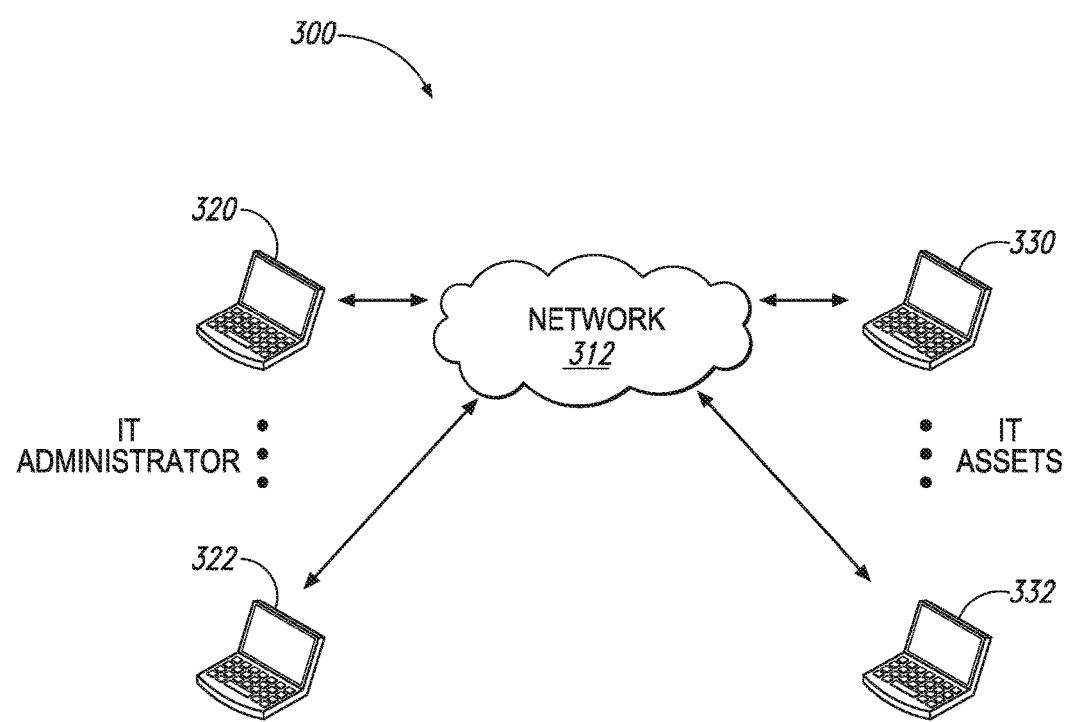
FIG. 3 illustrates another generalized example of a network topology in which described embodiments, techniques, and technologies can be implemented.

Another example of a possible network topology for implementing a system according to the disclosed technology is depicted in FIG. 3. Networked computing devices 320, 322, 330, 332 can be, for example, computers running a browser or other software connected to a network 312. As above, the computing devices 320, 322, 330, 332 can have computer architectures as shown in FIG. 1 and discussed above. The computing devices 320, 322, 330, 332 are not limited to traditional personal computers but can comprise other computing hardware configured to connect to and communicate with a network 312 (e.g., smart phones or other mobile computing devices, servers, network devices, dedicated devices, and the like).

In the illustrated embodiment, the computing devices 320, 322 are configured to communicate directly with computing devices 330, 332 via the network 312. In the illustrated embodiment, the computing devices 320, 322 are configured to locally implement any of the disclosed compliance and configuration control functionalities, implement any of the disclosed graphical user interfaces, and/or compute any one or more of the intermediate or final values associated with the disclosed embodiments. The computing devices 320, 322 can use data obtained from the computing devices 330, 332 via the network 312. Any of the data received from the devices 330, 332, can be stored or displayed on any of the computing devices 320, 322 (e.g., displayed as data on a graphical user interface or web page at the computing devices 320, 322).

In the illustrated embodiments, the illustrated networks 212, 312 can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the networks 212, 312 can be the Internet or a similar public network and operate using an appropriate protocol (e.g., the HTTP protocol).

IV. Introduction to the Disclosed Technology

Described herein are methods, systems, and apparatus that can be used to reconcile operating system patches and software updates in an information technology ("IT") environment. In particular embodiments, the disclosed technology can be used as part of (or in connection with) an IT compliance and configuration control software tool that provides compliance and configuration control of one or more IT assets. The IT assets can comprise, for example, servers, desktops, directory servers, hypervisors, databases, middleware applications network devices, and/or other such assets. The compliance and configuration control tool can be used to detect, analyze, and report on change activity in an IT infrastructure. For example, the compliance and configuration control tool can assess configurations of the one or more assets at one or more locations and determine whether the assets comply with internal and external policies. The compliance and configuration control tool can identify and validate changes to ensure these configurations remain in known and trusted states.

In particular implementations, the compliance and configuration control tool operates by capturing a baseline of server file systems, desktop file system, directory servers, databases, virtual systems, middleware applications, and/or network device configurations in a known good state. Ongoing integrity checks then compare the current states against these baselines to detect changes. The compliance and configuration control tool collects information used to reconcile detected changes, ensuring they are authorized and intended changes. The compliance and configuration control tool can crosscheck detected changes with defined IT compliance policies (e.g., using policy-based filtering), with documented change tickets in a Change Management Software (CMS) system or a list of approved changes, with automatically generated lists created by patch management and software provisioning tools, and/or against other desired and approved changes. This allows the compliance and configuration control tool to automatically recognize desired changes and expose undesired changes. The compliance and configuration control tool can also generate one or more reports concerning the monitored assets showing a wide variety of information (e.g., compliance information, configuration information, usage information, etc.)

One such compliance and configuration control tool that is suitable for use with the disclosed technology is the Tripwire® Enterprise tool available from Tripwire, Inc. The examples described below are shown as being used in connection with the Tripwire Enterprise tool. This particular usage should not be construed as limiting, however, as the disclosed technology can be used to manage and classify assets in other compliance and configuration control tools as well.

V. Change Compliance and Configuration Management in an IT Environment

One of the issues that arises when using a compliance and configuration control tool is interpretation and promotion of changes detected using the tool. In particular, users of a compliance and configuration control tool frequently desire to know the reason for a particular change or set of changes and which element of a certain computer system changed. It is particularly challenging to properly associate authorized operating system (OS) or other software updates with detected changes. Change detection tools such as Tripwire Enterprise are good at detecting changes in environment at the file level, but it can be difficult to reconcile thousands of small low-level changes. As a result, customers can become overburdened researching and reconciling changes due to ordinary software updates and patches, which in turn reduces the overall effectiveness of the compliance and configuration tool.

Change Management Software (CMS) integrations can be helpful in some instances, but frequently, IT environments do not have properly-adopted CMS tools. Thus, the effectiveness of a compliance and configuration tool is limited by the effectiveness of the change process.

Therefore, it is desirable to reduce effort spent on reconciling OS updates/patches, in order to allow system administrators to focus on exceptional detected changes.

In some examples, a Software Reconciliation Framework (SRF) correctly accounts for and associates granular file and directory changes with an appropriate software update or patch. Changes can be reconciled at the file-level, directory-level, registry level, or other suitable level of granularity. In some examples, an SRF tool can respond to a software change trigger (e.g., a software portion or update that is applied, modified, or removed from a system). In some examples, an SRF tool can respond to an authorized change trigger.

The SRF tool can assist in identifying other issues that are not related to software patches or updates by allowing users and administrators to avoid sifting through the details associated with those patches or updates. In some examples, a user can add a customized list of software to use in reconciling changes.

VI. Example Software Reconciliation Flow

FIG. 4 illustrates a Linux window 410 as a package manager (the package manager shown in FIG. 4 is yellow-dog updater modified or "yum") check-update operation is performed and a window 420 reporting a number of corresponding system update changers in a browser, as can be used in certain examples of the disclosed technology. Package managers are software tools that can be used to automate installation, upgrading, configuring, and deleting software packages on a host system. Suitable examples of package managers that can be used with the disclosed technology include yum, rpm (Red Hat Package Manager), ZYpp, Windows Installer, or Windows Package Manager can be used in certain examples of the disclosed technology.

An SRF tool can be used to promote changes based on an authorized change trigger. In some examples, an SRF tool can also automatically reconcile changes due to Microsoft Windows hotfixes or updates, user-specified software, or Linux RPM Changes (e.g., via a manifest obtained from an via authorized repository).

Figure 5:
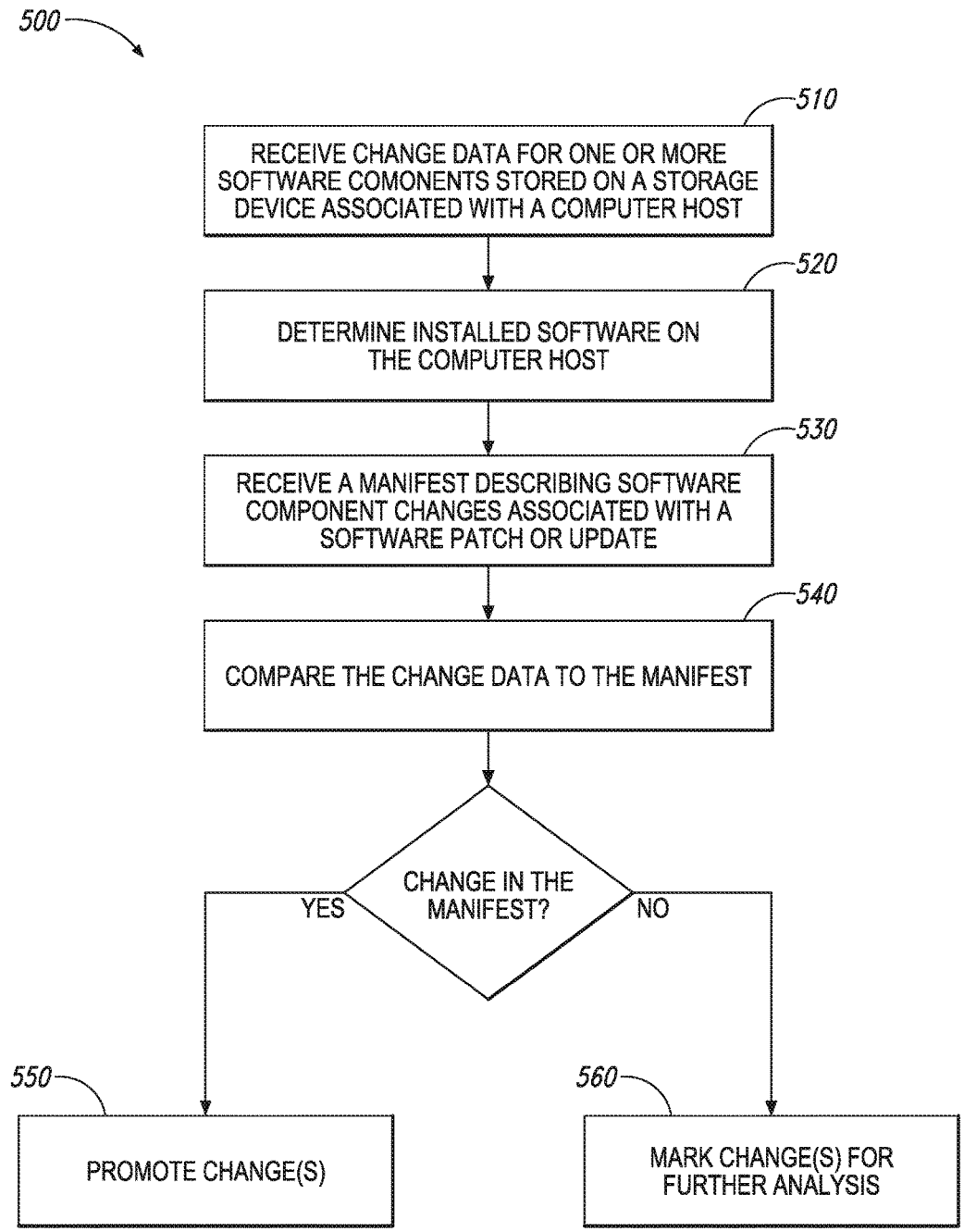
FIG. 5 is a flow chart that outlines an exemplary implementation of the disclosed technology.

FIG. 5 is a flow chart 500 detailing an example method of software reconciliation, as can be used in certain examples of the disclosed technology. FIGS. 6A through 6E illustrate various aspects of the exemplary method of FIG. 5 in further detail.

At process block 510, change data is received for one or more elements stored on a storage device associated with a computer host. For example, change data can be received for file changes, including file modifications, deletions, additions, and/or for file metadata changes, including changes in size, changes in permissions, changes in a time stamp, changes in a checksum, md5 hash, or other signature based on the changed file. Change data can be received using other suitable techniques for detecting software component changes. In some examples, change data can be received for changed registry entries. For example, change data can be received when one or more files or registry entries are changed when a target host is patched or updated. Change data can be received from a compliance and configuration control tool, such as the Tripwire Enterprise tool, as discussed in further detail above.

Figure 6A:
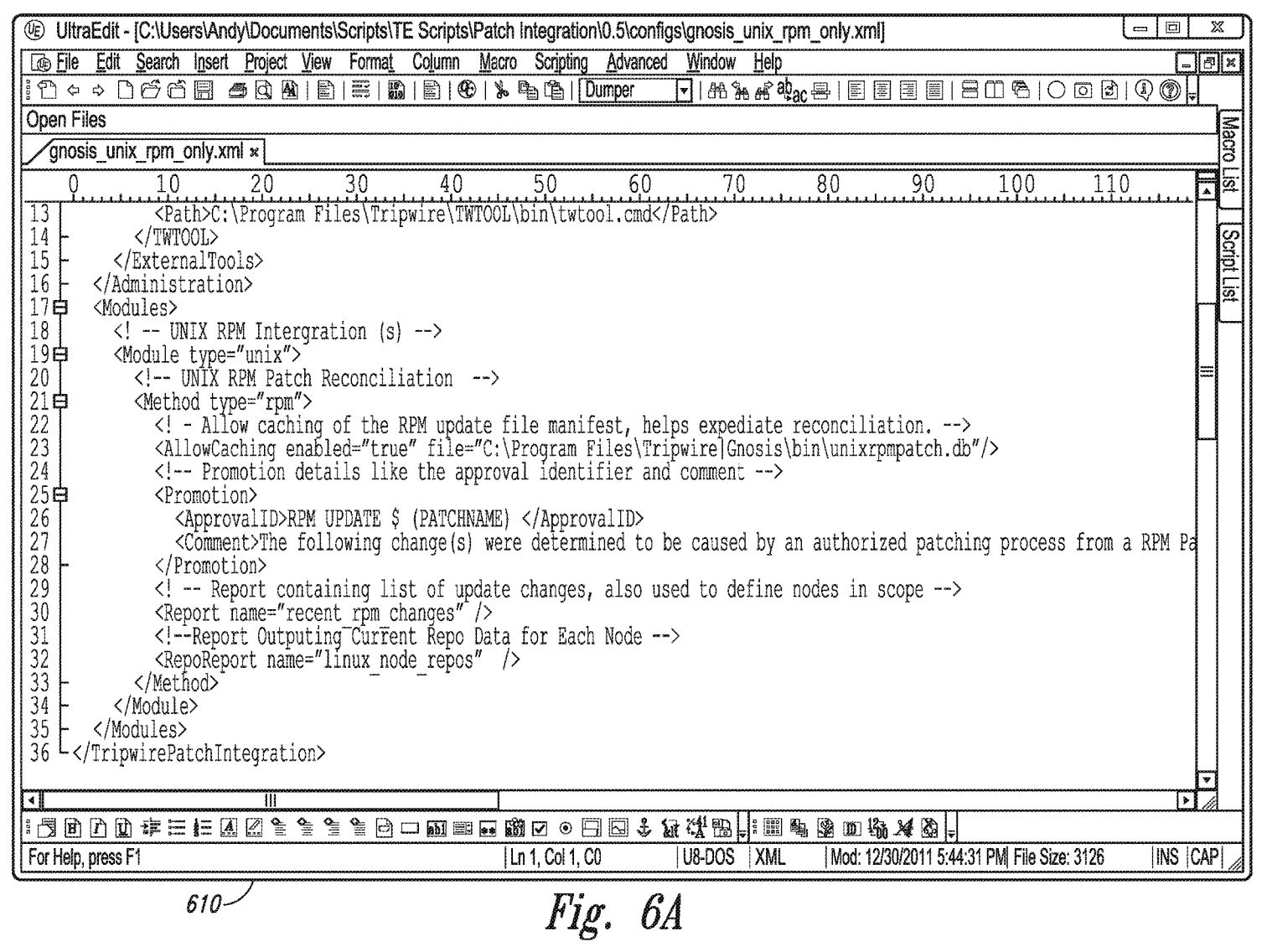
Figures 6B, 6C:
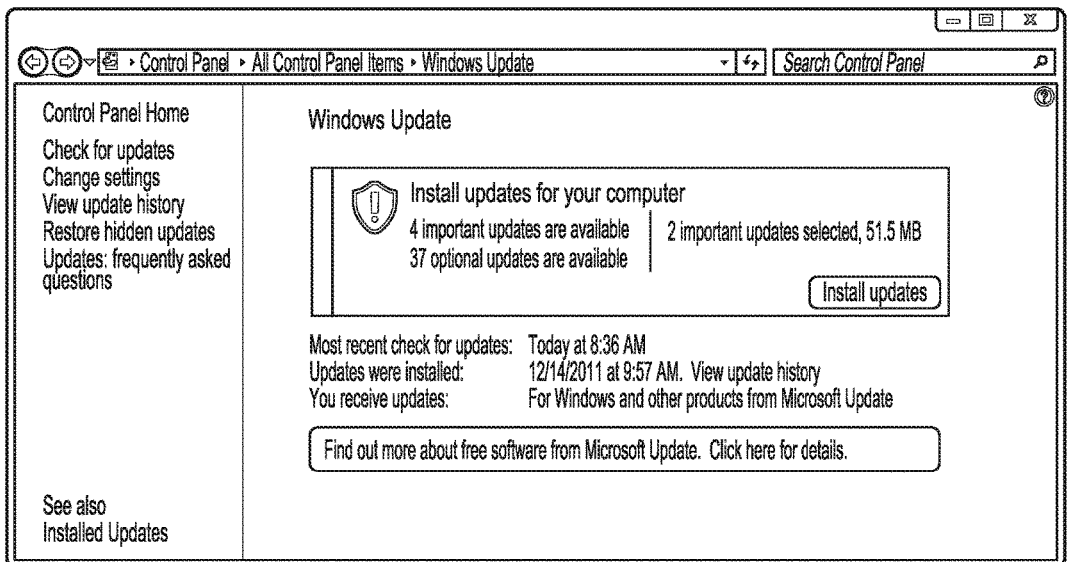

Changes can be detected when a target host is patched or updated by a user, by a system administrator, and the patches and updates can occur automatically or via manual intervention. For example, a Microsoft Windows system can be updated using Microsoft Automatic Updates or a Windows Server Update Services (WSUS) server, or for Linux systems, when a yum update occurs, an RPM package is installed or removed, or another similar method of update is performed. In some examples, the patches or updates are not intentional, and may be caused by software error or malware operating on the target host. FIG. 6B illustrates a number of updates being installed on a target host running a Microsoft Windows operating system in a Windows Update window 610. Many updates can result in hundreds or thousands of file changes and/or registry entry changes.

Changes can be detected due to the patches or updates that occur at a host. For example, as shown in the web console interface 630 of a compliance and configuration tool depicted in FIG. 6C, a number of changes are received for a series of elements (e.g., files or registry entries), and change analysis is used to determine whether the change is at least one or more of the following: an addition, modification, or deletion, along with metadata associated with the change, for example, the current version of the change, the severity of the change, and/or a rule associated with the change. In some examples, the change detection can occur on the target host where changes were detected, while in other examples, changes can be detected on a remote target host and sent to another server for analysis. The changes can be detected using a command output capture rule (COCR) implemented using an agent or a compliance and configuration control tool on the target system. Changes to the target host can be detected using one or more COCRs. COCRs can also be used to associate a software application with a particular set of files.

Figure 11:
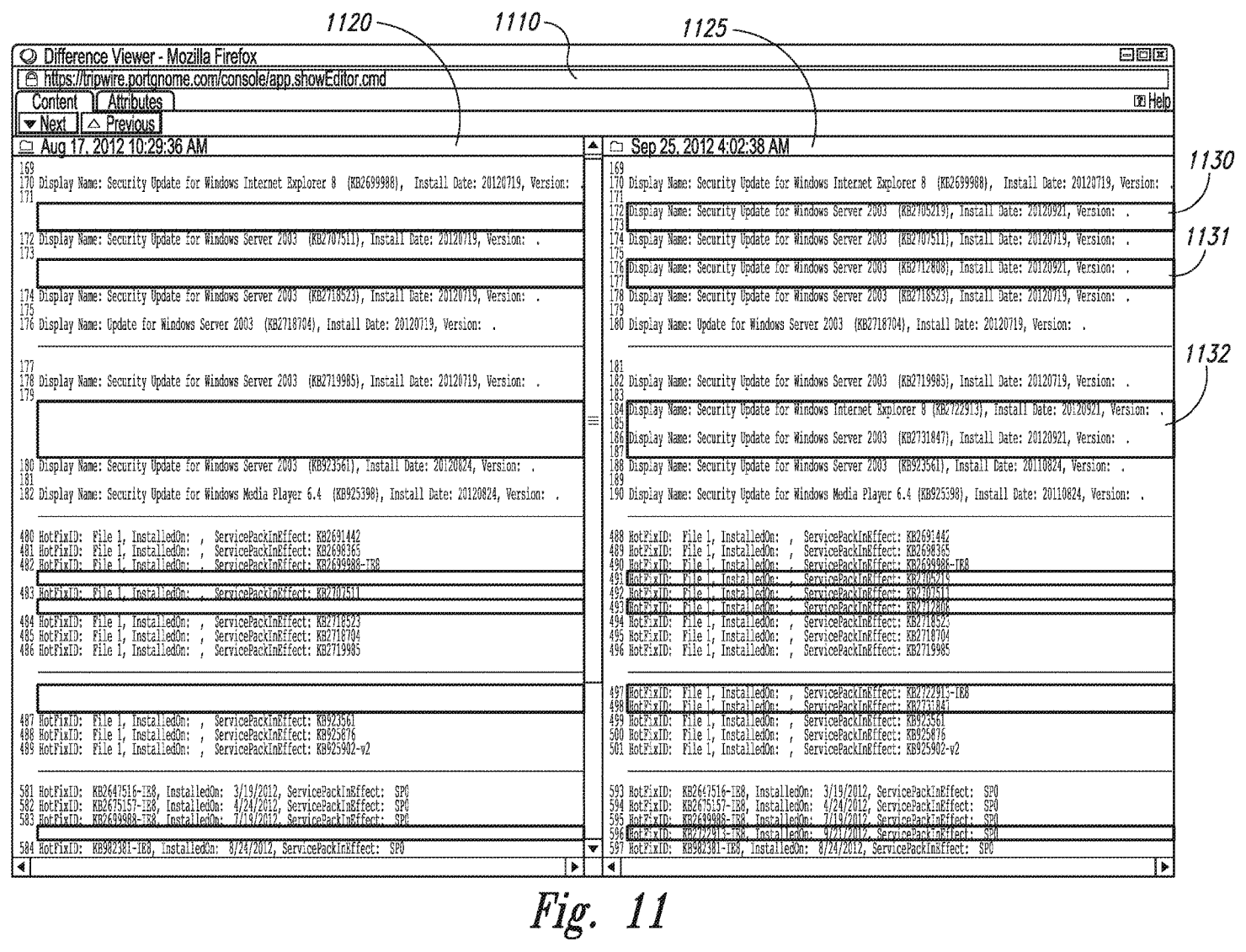

In some examples of the disclosed technology, a command output capture rule (COCR) defines a number of commands to be run to generate and capture output on a file server. This output can be compared to a baseline version to detect changes. The output can be saved along with additional identifying information for the output, for example, an md5 hash of the output and/or the exit code of the command(s) used to generate the output. FIG. 11 illustrates comparison tool output in a GUI window 1110 of software components that are detected before 1120 and after 1125 new software components were installed on a host computer. As shown in FIG. 11, a number of additional software components (e.g., components 1130, 1131, and 1132) have been detected on the host computer using a COCR. After the change data is received, the method proceeds to process block 520.

At process block 520, information regarding the software installed on the computer host is determined. For example, the name of software components and/or software applications, versions associated with the software, and other information can be determined. In some examples, this determination is made by searching for executable code, searching for registry entries, or searching a database describing software installed on a computer host, which searches can be performed on any computer-readable storage devices coupled to the computer host. In some examples, COCRs can be used to enumerate all the software currently installed on a target host. In some examples, software package or update managers can be used to determine installed software. After determining installed software, the method proceeds to process block 530.

At process block 530, one or more software manifests are received. Software manifests can be obtained from a number of different mechanisms, including Microsoft Windows hotfixes, Windows updates, user-specified updates, custom software, or Linux RPM changes such as those created in response to yum updates, yum installs, and/or yum removals from authorized repositories. As will be readily discernible by one of ordinary skill in the art, any other suitable source of software manifests can be used, including but not limited to: AIX RPMs, Solaris Packages, and HP-UX Depots.

In some examples of the disclosed technology, software manifest(s) are received in response to a request sent when changes are detected on the computer host. In other examples, software manifests are received automatically, for example, when a patch or update is installed, or periodically sent from a software provider or system administrator to be stored in a local cache. In some examples, a manifest is requested after determining software that is installed on the computer host by using one or more techniques described above regarding process block 520, including searching for executable code, searching for registry entries, or searching a database describing software installed on a computer host, which searches can be performed on computer-readable storage devices coupled to the computer host.

In some examples of the disclosed technology, the method includes acquiring one or more RPM packages that have been identified as recently changed by downloading the most recent repositories from one or more repository hosts and then downloading one or more respective RPMs from the repository associated with the host that a change was detected on. This is performed to ensure that the correct RPM package is acquired. Once the correct RPM is identified, the RPM is downloaded, and a file manifest is extracted. In some examples, a user or administrator can review the changes that were detected and verify that they were promoted according to the RPM package that was assigned.

In some examples of the disclosed technology, data for a series of configurable reconciliation modules is received. The reconciliation modules can be described in Extensible Markup Language (XML) format, as shown in the window 610 of FIG. 6A, which includes information regarding caching file manifests, approval identifiers, repository information, and reporting data. Software reconciliation techniques can be applied to, for examples, Linux RPM package changes via an authorized repository, Microsoft Windows updates and hotfixes, and Microsoft Windows user-specified software changes. The configurable reconciliation modules can also include additional information such as system credentials, URLs for an application layer of a network interface (e.g., a Simple Object Access Protocol (SOAP)) interface, or other suitable data. After one or more manifests are received, the method proceeds to process block 540.

At process block 540, an analysis is performed on the changes detected at process block 510 using the manifest(s) received at process block 530, thereby comparing the change data and the manifest(s). As shown in terminal window 640 depicted in FIG. 6D, the changes are analyzed against a number of update databases, for example, a Windows update database, a user software update database, and a Linux RPM repository. One or more element manifests can be generated from the update databases. For example, the element manifest may include a file path, a file name, a file size, date, file version, a checksum, or signature (e.g., an md5 hash signature) of the expected value of a file. In other examples, a registry value can be compared to an expected registry value. In some examples, the software manifest is informally published, such as a posting on Microsoft Technet accompanying a software update, and downloaded via a screen-scraping approach. In other examples, a more formal description of changes associated with a file update is deployed. In some examples, the analysis can take into account files or other elements that have been previously promoted as acceptable (for example, changes that are promoted and stored as promotion data in a promotion database). Based on the results of the comparing, the method proceeds to process blocks 550 and/or 560.

At process block 550, element changes that match expected values in the element manifest derived from one or more update databases are promoted, for example, by approving or acknowledging that the detected changes are acceptable. This promotion allows the changes to be accepted as expected or normal changes, and also allows the changes to be filtered from change detection reports. The element manifest can also include an indication that a promotion should be automatically or manually promoted. A report illustrating a number of promoted system update changes is shown in a report viewer window 650 of FIG. 6E. In some examples, the matching elements changes can be stored in a promotion database, along with additional information describing the change, such as an identification number for the change, the date the change was detected, and/or information describing the manifest from on which the promotion of the change was based. In some examples, the promoted changes are used to enhance the effectiveness of a change management process developed by a user. In some examples, the promoted changes can provide compliance data used for Payment Card Industries (PCI) regulation.

At process block 560, element changes that do not match expected values in the element manifest are marked for further analysis. For example, a report is generated and a system administrator notified that a number of changes that do not match the manifest have been detected. In some examples, the element changes that do not match expected values can be submitted to software suitable for detecting viruses or other malware. In some examples, the non-matching elements are stored in a database.

After promoting expected changes and/or reporting marked changes at process blocks 550 and 560, a report can be generated that includes, e.g., the marked changes and the expected changes. The report can include a list of the individual files that have been detected as changed and an identifier that includes a list of the RPM package associated with that particular change. Thus, the exemplary method depicted in FIG. 5 can respond to the fact that a package has changed on the system and then identify what files were included in the package and be promoted accordingly. This helps ensure that any unauthorized changes that were made to the system around or about the same time will not be included in the update and instead will be treated as unauthorized changes.

The element manifests described above can be retrieved from a software publisher or software distribution site (e.g., from a Microsoft Technet update article or Microsoft SIMS or Access database), but element manifests can also be user-defined in certain embodiments. A user-defined element manifest allows a user to specify a manifest of expected changes for a given software package. This allows users the opportunity to customize manifests for software that they anticipate to change, as well as the ability to supply the information regarding what elements can be expected to change for a particular software package. For example, a Windows update and hotfix module could be rendered useless if a user were to apply a service pack to Microsoft SQL server, or even simply install or remove Microsoft SQL server, because these changes are not a registered update. Providing a generic software module interface gives a user or administrator the opportunity to anticipate which types of underlying changes will occur to assist them should a given software package be applied or removed on that system. The user can designate a rule indicating that if a change occurs to a program named Microsoft SQL Server 2005 or Microsoft SQL Server 2008, then a number of changes are anticipated. For example, changes made to the directory C:\Program Files\microsoft sQLserver\ or to a data file location (e.g., the E: drive or a network path) can be specified in a manifest specific to the corresponding directory and/or data file location. Other software that is typically updated more frequently can also be included, for example, antivirus updates, changes to other agents, or changes to other proprietary software that is not recognized with previous technology.

For example, Microsoft SQL Server updates or upgrades may result in changes to the following directories:
C:\Program Files\Microsoft SQL Server\*
E:\MSSQL.10\*

As another example, Tripwire Enterprise (TE) Agent updates or upgrades may result in changes to the following directories:
C:\Program Files\Tripwire\TE\Agent\*

Changes in those directories can be detected and promoted if a change to the software package is detected using an element manifest.

A Software Reconciliation Framework (SRF) can be installed, configured, and utilized as follows. An SRF can be used as an external reconciliation tool for a change detection tool (e.g., Tripwire Enterprise (TE)) to assist a change manager or administrator better understand the origin of a given change as it relates to authorized OS or software updates or upgrades.

An SRF tool can assist a user by responding to package changes and acquiring a file manifest for the packages to promote or mark chose elements that change as a result of the package change. This allows a change manager or administrator to focus on those exceptions or changes that may not have been authorized.

An SRF user can create a manifest, by, for example, modifying an existing XML manifest template. One or more sources of change information can be identified using, e.g., a URL or a SOAP URL to specify locations to search for change information.

Executable code implemented in an SRF tool can be executed regularly, using, e.g., a Unix cron job or a Windows Scheduled Task. SRF executable code can be run multiple times with different configuration files, if desired. SRF tasks should be executed well after change detection tasks have completed, but before any report tasks that may report software update changes.

SRF executable code can also be configured to use rules for detecting and reconciling changes received from a software update database. For example, RPM package updates from an authorized yum repository can be configured for detection using a rule.

Rules, element manifests, and other configuration data can be cached. This allows the SRF tool to remember package manifests without having to query update repositories with every package request. Caching can be enabled with an attribute in a configuration file. Similarly, promotion options can be configured by specifying an approval identifier identifying a description of the promotion decision, as well as additional information related to the promotion.

Figure 7:
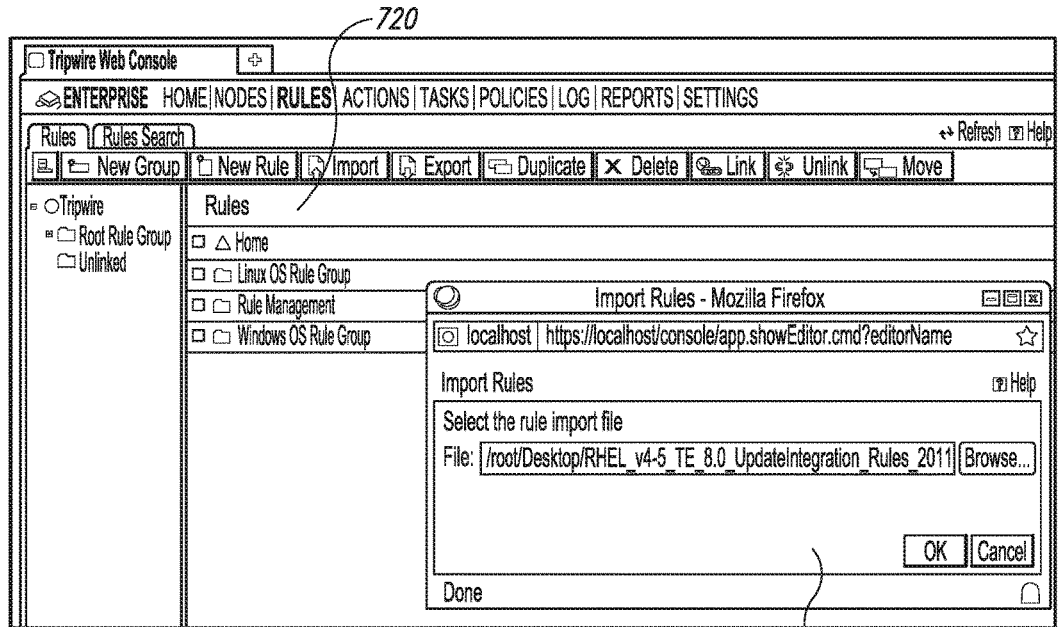
FIG. 7 illustrates an exemplary importation of integration rules with a baseline set of rules, as can be practiced in certain embodiments of the disclosed technology.

FIG. 7 illustrates an exemplary importation of integration rules with a baseline set of rules, as can be practiced in certain embodiments of the disclosed technology. It is desirable to configure the SRF to verify that existing check tasks will check new integration rules periodically. As shown, in FIG. 7, a rule file is being selected using a GUI window 710. A number of different rule sets for different operating systems can be managed using the same GUI window 710.

Figure 8:
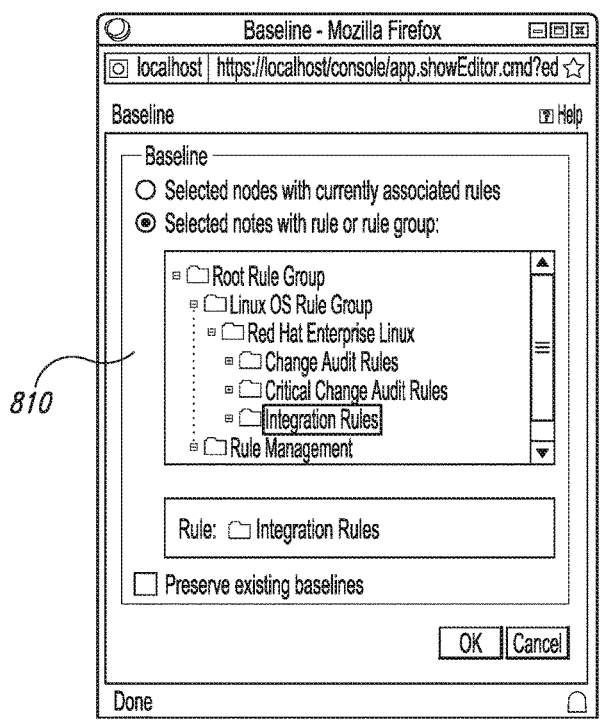

FIG. 8 illustrates an exemplary association of new integration rules with one or more change monitoring tasks. As shown in FIG. 8, the integration rules that were selected as shown in FIG. 7 are selected to be included in change monitoring using a GUI window 810. Thus, new integration rules can be included with existing task checks, and hence detected changes according to the selected integration rules can be monitored along with other rules (for example, Change Audit Rules and Critical Change Audit Rules, as shown in FIG. 8).

In some examples, caching of manifests can be used. This allows the SRF to access locally-stored package manifests without having to query repositories or otherwise access a manifest over a network with every package request. In some examples, the package manifests can be stored on a computer-readable storage device coupled to a host computer that is monitored by a change agent.

Figure 9:
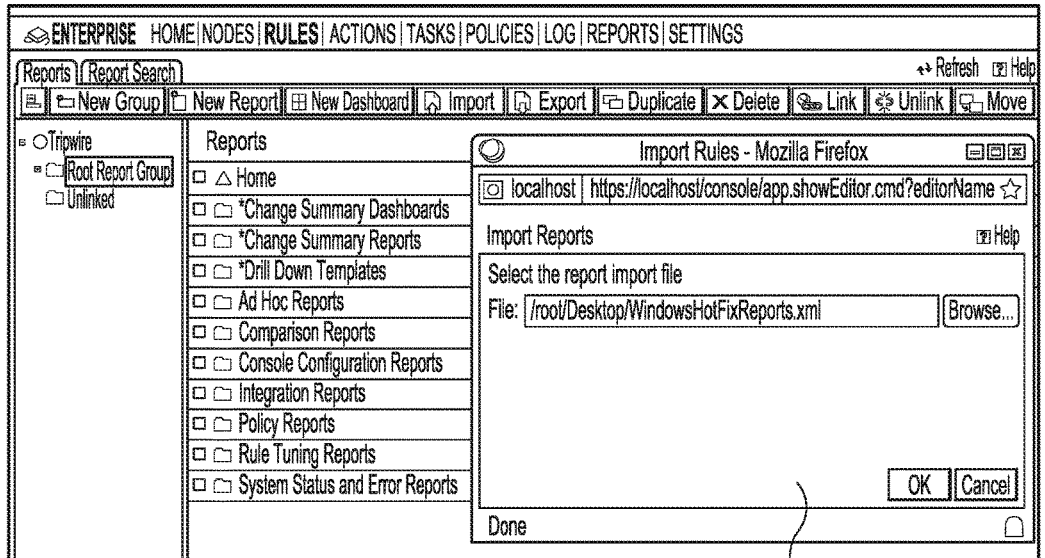

FIG. 9 illustrates importation of a report template file, as can be used in certain examples of the disclosed technology. As shown, the report template file can be imported as an XML configuration file using a GUI window 910.

An example XML configuration block that can be used by an SRF tool for described desired monitoring and promotions for an application is shown below:

```
<Application name="Some Application Name">
    <Conditions>
        <Condition>^Acme\sSoftware\Application\s+v\d+</Condition>
    </Conditions>
    <Manifests>
        <ManifestItem>C:\Win*\AgentPlugin\Framework</ManifestItem>
        <ManifestItem>C:\Program Files\Acme\Software Application</ManifestItem>
        <ManifestItem>C:\Program Files (x86)\Acme\Software Application</ManifestItem>
    </Manifests>
    <Promotion>
        <ApprovalID>SOFTWARE CHANGE $(NAME)</ApprovalID>
        <Comment>The following change(s) were determined to be caused by an authorized patching/installation process from approved software updates.</Comment>
    </Promotion>
</Application>
```

As shown in the XML configuration block above, the "name" attribute for the <Application> field is used to indicate a display name for the software package, but is not used for matching. Thus, this XML configuration block is an example that can be used by an SRF tool to detect and promote user-configurable software changes.

A number of <Condition> regular expression strings can be included to specify to the SRF how to match the software if reported as a changed package. As shown above, the Condition regular expression will match a number of integer-designated versions (e.g., "v1" or "v20") of "Acme Software Application" in a changed file.

Figure 10:
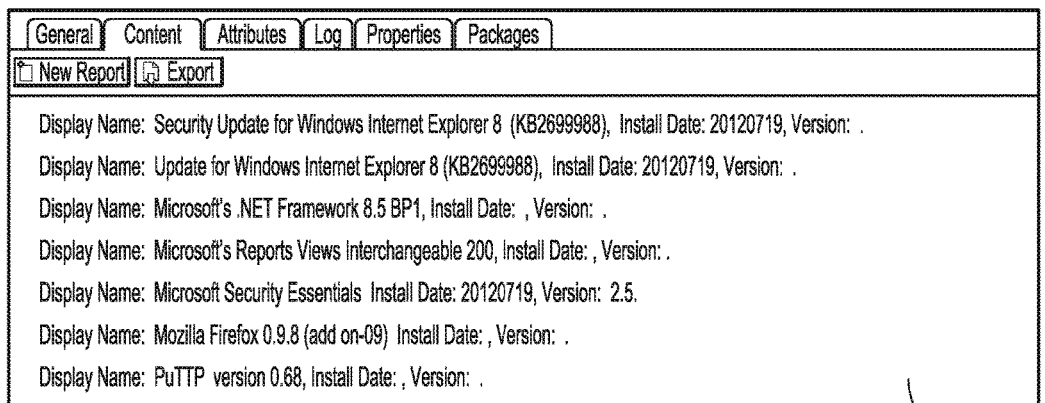

An exemplary software list output is shown in a GUI window 1010 of FIG. 10. The software list as shown indicates the name of a software component, installation date, and a version of the software component. In some examples, additional fields can be used, or some fields can be omitted. As shown in FIG. 10, the text listed after the "Display Name:" string will be considered using the regular expression(s) specified in <Condition>. For example, a condition can be specified to match the Firefox shown in the example of FIG. 10 as follows:

<Condition>^Mozilla\sFirefox\s\d+\.\d+\.\d+</Condition>

Under <Manifests>, a list of files or registry objects that could change as a result of a modification to this software package can be created and included under <ManifestItem>. As many <ManifestItem> elements as needed can be created. The SRF can automatically append a wildcard "*" character to the end of a string in <ManifestItem> so additional wildcards are not required.

Any of the methods described herein can be performed via one or more computer-readable media (e.g., storage or other tangible media) comprising (e.g., having or storing) computer-executable instructions for performing (e.g., causing a computing device to perform) such methods. Operation can be fully automatic, semi-automatic, or involve manual intervention.

Having illustrated and described the principles of the disclosed technology, it will be apparent to those skilled in the art that the disclosed embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa. For example, any one or more aspects of the disclosed technology can be applied in other embodiments.

In view of the many possible embodiments to which the principles of the disclosed technologies can be applied, it should be recognized that the illustrated embodiments are only preferred examples of the technologies and should not be taken as limiting the scope of the invention. Rather, the scope of the invention is defined by the following claims. We therefore claim as our invention all that comes within the scope of these claims and their equivalents.

I claim:

1. A computer-implemented method of using a Software Reconciliation Framework (SRF) tool for reconciling software changes on a host computer, the method comprising:
   receiving detected changes to one or more files stored on a computer-readable storage device coupled to the host computer, the changes being detected with an agent or compliance and configuration tool executing on the host computer;
   generating change data describing the detected changes, wherein the change data comprises one or more identifiers of one or more changed files;

determining a network address associated with a software repository for installed software based on repository information stored on the computer-readable storage device;

transmitting a request to receive a manifest for the installed software to a remote server associated with the installed software, the request identifying at least some of the installed software, wherein the request for the manifest is transmitted over a network based on the network address;

responsive to the receiving of the detecting changes, matching the one or more identifiers of the one or more changed files to a change condition associated with the manifest for the installed software, wherein the manifest for the installed software comprises a description of file changes associated with a software patch or update for the installed software, wherein the description of file changes comprises one or more identifiers of files changed by the software patch or update;

comparing the one or more identifiers of the one or more changed files in the change data to the one or more identifiers of files changed by the software patch or update described in the manifest; and when the comparing indicates the change data matches the manifest, promoting the changes, thereby producing promoted changes, and when the comparing indicates the change data does not match the manifest, marking the changes for further analysis, thereby producing marked changes.

2. The method of claim 1, wherein an act of determining and comparing are initiated in response to the receiving the changes.

3. The method of claim 1, wherein the manifest is based at least in part on expected changes specified by a user of the computer.

4. The method of claim 1, wherein the manifest is generated by a publisher or distributor of the installed software.

5. The method of claim 1, wherein the manifest is based at least in part on a listing of files associated with a version of the patch or update of the installed software.

6. The method of claim 1, wherein the manifest includes a regular expression describing a data file location that does not include program files for the installed software.

7. The method of claim 1, wherein the change condition associated with the manifest for the installed software comprises a regular expression that is matched to the one or more identifiers of the one or more changed files.

8. The method of claim 1, wherein:
the change data further comprises one or more identifiers of one or more changed registry entries; and
the manifest further comprises one or more identifiers of one or more registry entries changed by the software patch or update.

9. A system, comprising:
one or more processors;
memory coupled to the processors;
at least one network interface; and
one or more non-transitory computer-readable storage media coupled to the processors, the computer-readable storage media storing modules comprising computer-executable instructions executable by the processors, the modules comprising:
a manifest acquisition module stored in the computer-readable storage media, wherein the manifest acquisition module is configured to:

determine a network address associated with a software repository for one or more software modules stored on the computer-readable storage media, based on repository information stored on the computer-readable storage media, transmit a request to receive one or more manifests for the one or more software modules to a remote server associated with the one or more software modules, wherein the request for the one or more manifests is transmitted over a network based on the network address, and receive the one or more manifests using the network interface, the one or more manifests comprising descriptions of file changes associated with a software patch or update for the one or more software modules stored on the computer-readable storage media, wherein the descriptions of file changes comprise one or more identifiers of files changed by the software patch or update for the one or more software modules;

a user-configurable reconciliation module stored in the computer-readable storage media, wherein the user-configurable reconciliation module is configured to reconcile changes detected in the system by:

causing the manifest acquisition module to request the one or more manifests based on at least one of the detected changes, wherein a data file identifier of the at least one of the detected changes is matched to one or more change conditions associated with the one or more manifests, and reconciling the at least one of the detected changes based on approved changes determined with the received one or more manifests, wherein the reconciling comprises comparing the data file identifier of the at least one of the detected changes to the one or more identifiers of files changed by the software patch or update for the one or more software modules described in the one or more manifests;

a configuration module stored in the computer-readable storage media, wherein the configuration module is configured to provide access to system credentials and network addresses that can be accessed by the manifest acquisition module to request the manifests using an application layer of the network interface; and a rule configuration module stored in the computer-readable storage media, wherein the rule configuration module is configured to manage rules defining changes to software modules that have been defined as approved.

10. The system of claim 9, further comprising a cache for storing the manifests, the cache allowing the reconciliation module to access a previously-received manifest without using the network interface.

11. The system of claim 9, further comprising a promotion database configured to store definitions of changes that have been promoted using the rule configuration module.

12. One or more non-transitory computer-readable storage media storing computer-executable instructions that, when executed by a processor, cause the processor to perform operations, the operations comprising:

detecting changes to one or more files stored on a computer-readable storage device coupled to a host computer and generating change data describing the detected changes, wherein the change data comprises one or more identifiers of one or more changed files;

determining a network address associated with a software repository for installed software based on repository information stored on the computer-readable storage device;

matching the one or more identifiers of the one or more changed files to a change condition associated with a manifest for the installed software, wherein the manifest comprises a description of file changes associated with a software patch or update for the installed software, wherein the description of file changes comprises one or more identifiers of files changed by the software patch or update;

transmitting a request to receive the manifest for the installed software to a remote server associated with the installed software, the request identifying at least some of the installed software, wherein the request for the manifest is transmitted over a network based on the network address;

comparing the one or more identifiers of the one or more changed files in the change data to the one or more identifiers of files changed by the software patch or update described in the manifest;

if the change data matches the manifest, promoting the changes, thereby producing promoted changes; and otherwise, marking the changes for further analysis, thereby producing marked changes.

13. The one or more non-transitory computer-readable storage media of claim 12, wherein detecting the changes to the one or more files comprises detecting a file change trigger.

14. The one or more non-transitory computer-readable storage media of claim 12, wherein the detected changes are a first set of detected changes, and wherein the operations further comprise:

detecting a second set of one or more changes, the second set of changes including at least one change in the first set of changes;

comparing one or more identifiers of the one or more changed files in the second set of changes to the one or more identifiers of files changed by the software patch or update described in the manifest; and not marking at least one of the changes in the second set of changes for further analysis, based on at least one or more of the second set of changes matching one of the produced promoted changes.

15. The one or more non-transitory computer-readable storage media of claim 12, wherein the operations further comprise analyzing the host computer to detect one or more software packages installed on the host computer, wherein the generating the change data is based at least in part on the detected one or more installed software packages.

16. The one or more non-transitory computer-readable storage media of claim 12, wherein the operations further comprise:

generating a description of expected changes by comparing one or more software components associated with a version of the installed software to generate a list of updated or changed software components; and transmitting the description to the host computer, wherein the description includes an indication of the version of the installed software and the list of updated or changed software components.

17. The one or more non-transitory computer-readable storage media of claim 12, wherein the operations further comprise:

generating a description of expected changes by comparing one or more software components to entries in a user-defined list, the user-defined list indicating expected changes to at least one of the software components installed on the host computer; and transmitting the description to the host computer, wherein the description includes an indication of the version of the installed software and the list of updated or changed software components.

* * * * *